United States Patent [19]

Schroeder et al.

[11] Patent Number: 5,312,017
[45] Date of Patent: May 17, 1994

[54] PRODUCT IDENTIFICATION SYSTEM FOR BEVERAGE DISPENSER

[75] Inventors: Alfred A. Schroeder; Michael T. Romanyszyn, Jr., both of San Antonio, Tex.; Norman P. Wittig, Corry, Pa.; Jack F. Brumley, Houston, Tex.

[73] Assignee: The Coca-Cola Company, Atlanta, Ga.

[21] Appl. No.: 883,332

[22] Filed: May 14, 1992

Related U.S. Application Data

[63] Continuation-in-part of Ser. No. 843,757, Feb. 28, 1992, which is a continuation of Ser. No. 752,406, Aug. 30, 1991, abandoned.

[51] Int. Cl.$^5$ .............................................. B67D 5/06
[52] U.S. Cl. .............................. 222/23; 222/63; 222/129.1; 222/129.4; 222/327
[58] Field of Search ........................ 222/1, 23, 95, 105, 222/57, 63, 129.1, 129.3, 129.4, 134, 135, 137, 129.2, 145, 252, 256, 326, 327, 386, 387, 390, 325, 63, 262

[56] References Cited

U.S. PATENT DOCUMENTS

| | | | |
|---|---|---|---|
| 3,599,833 | 8/1971 | Reichenberger | 222/23 |
| 3,688,947 | 9/1972 | Reichenberger | 222/129.3 X |
| 3,920,149 | 11/1975 | Fortino et al. | 222/129.3 X |
| 4,580,721 | 4/1986 | Coffee et al. | 222/23 X |
| 4,624,395 | 11/1986 | Baron et al. | 222/129.3 X |
| 4,722,372 | 2/1988 | Hoffman et al. | 222/52 X |
| 5,031,797 | 7/1991 | Boris et al. | 222/23 |

Primary Examiner—Andres Kashnikow
Assistant Examiner—Kenneth Bomberg
Attorney, Agent, or Firm—Thomas R. Boston; W. Dexter Brooks; Lynne R. O'Brien

[57] ABSTRACT

A system for automatically identifying the desired concentrate to water ratio of a juice product in a concentrate container inserted into a juice dispenser and for automatically switching the ratio control system to the desired ratio. The system includes a product ratio I.D. member having ratio indicia on the fill plug of the container and a sensor in the dispenser. The sensed information is used by the ratio control system in the dispenser to change the pump motor speed to provide the desired ratio.

5 Claims, 8 Drawing Sheets

PRODUCT IDENTIFICATION SYSTEM FOR BEVERAGE DISPENSER

CROSS REFERENCE TO RELATED APPLICATION

This is a continuation-in-part of U.S. patent application Ser. No. 07/843,757 filed Feb. 28, 1992, which was a continuation of U.S. patent application Ser. No. 07/752,406 filed Aug. 30, 1991, now abandoned.

BACKGROUND OF THE INVENTION

1. Field of the Invention

This invention relates to postmix beverage dispensers and in particular to a system for automatically identifying the desired concentrate to water mixing ratio of the product in a juice concentrate container loaded into the dispenser.

2. Description of the Prior Art

Postmix juice dispensers are well-known for mixing together a quantity of juice concentrate and water to produce a beverage. Different juice concentrates are mixed with water at different ratios. When changing from one concentrate to another that requires a different ratio, changes must be made in the dispenser to change the ratio. Different dispensers use different systems to achieve the desired ratio and also to change the desired ratio. One known system, where the ratio is controlled by the speed of a motor that drives a concentrate pump, requires the operator to manually actuate a switch. If this is not done, or is done incorrectly, then the beverage is dispensed at the wrong ratio and the beverage quality is not satisfactory.

SUMMARY OF THE INVENTION

This invention overcomes the problems in the prior art caused by the requirement for a manual operation to change ratio, and provides a system for automatically identifying which of several different juice concentrates are in a concentrate container loaded into a beverage dispenser and for automatically switching the ratio control system in the dispenser to a different ratio. This system includes a product ratio I.D. (identification) member on the bottom of each concentrate container and a product ratio I.D. sensor in each container receiving chamber in the beverage dispenser. When a container is inserted into the chamber, the sensor automatically identifies the product ratio through the information on the I.D. member. This identification is then automatically used by the ratio control system of the dispenser to provide the proper ratio and thus a proper beverage, without the need for any manual operation. Throughout the present patent application, as will be readily understood by anyone skilled in this art, the phrase "identify the product ratio" shall mean "identify the desired concentrate to water mixing ratio for the product".

BRIEF DESCRIPTION OF THE DRAWINGS

The present invention will be more fully understood from the detailed description below when read in connection with the accompanying drawings wherein like reference numerals refer to like elements and wherein:

FIG. 4AA is a perspective view of FIG. 4A;

FIG. 5AA is a perspective view of FIG. 5A;

FIG. 6AA is a perspective view of FIG. 6A;

DETAILED DESCRIPTION OF THE PREFERRED EMBODIMENT

With reference now to FIGS. 1-8 of the drawings, the drawings show an apparatus for automatically identifying the product ratio of a juice product contained in a concentrate container 10 inserted into a postmix beverage dispenser 12. The dispenser 12 includes a container-receiving chamber 14 having a product ratio I.D. sensor 16 mounted therein. The container 10 has product ratio indicia 18 thereon to be sensed by the sensor 16.

The dispenser 12 includes a support 20 for supporting the container 10 in only one orientation in the chamber 14. In this one orientation, the indicia 18 are in contact with the sensor 16.

Figure 2:
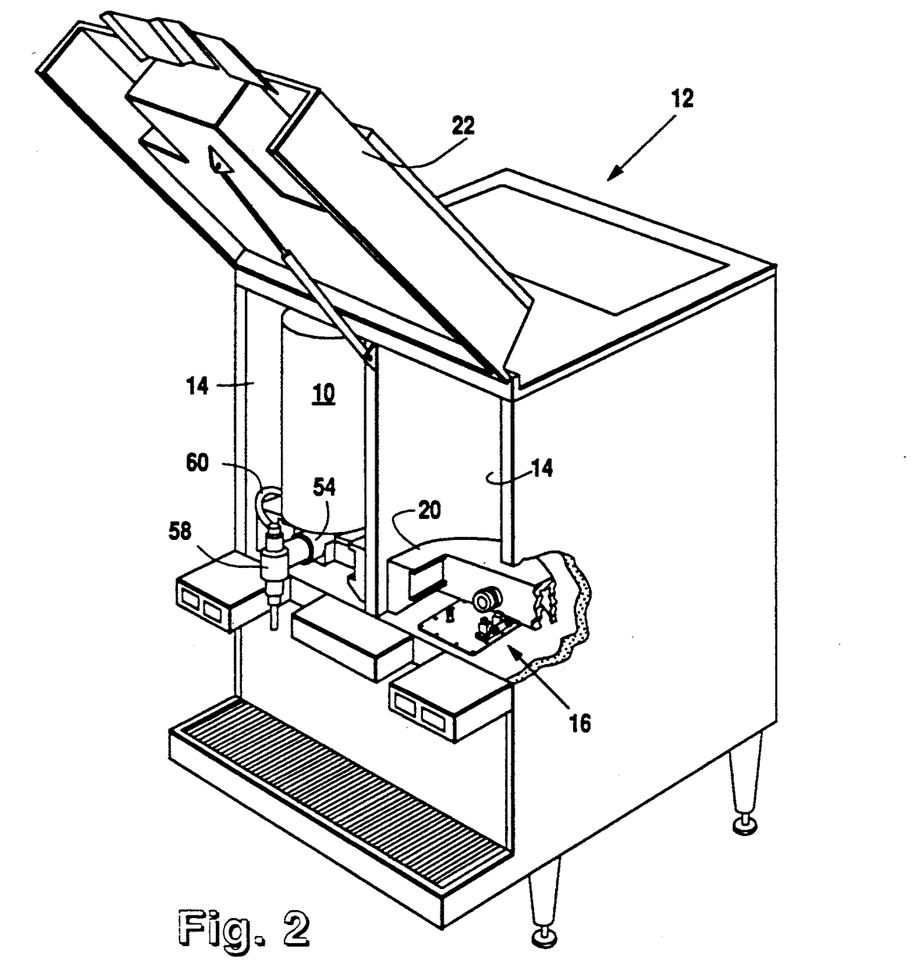
FIG. 2 is a view similar to FIG. 1 with the front cover opened and part of a wall broken away.

FIG. 2 shows the dispenser 12 with its front cover 22 opened revealing a pair of concentrate container-receiving chambers 14. A container 10 has been inserted into the left chamber 14 and the right chamber 14 is shown empty.

Figure 3:
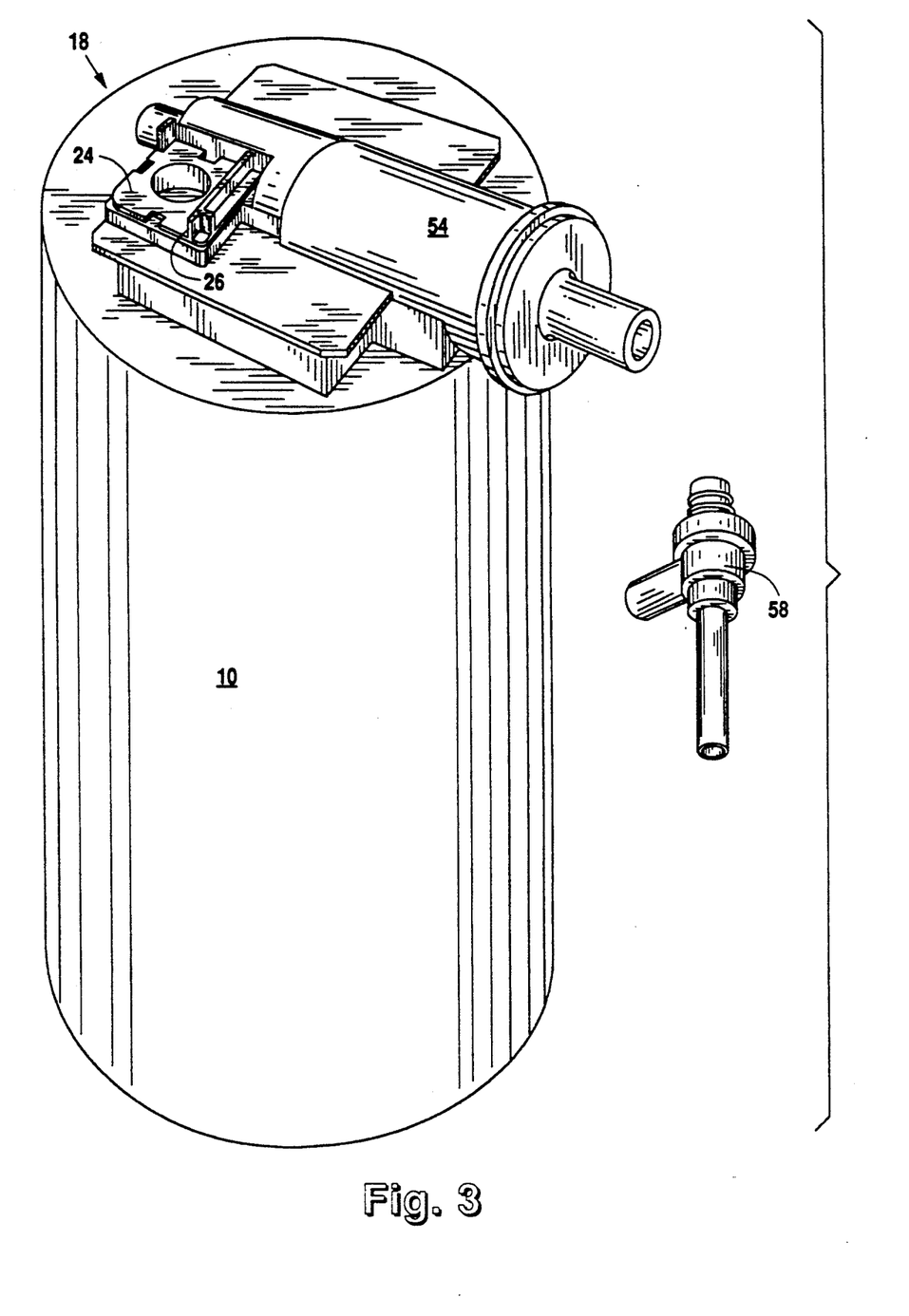
FIG. 3 is a view of a concentrate container shown upside-down in its filling, shipping and storing orientation and showing the product ratio I.D. member.

FIG. 3 shows a container 10 upside-down in its filling, shipping and storage position. The container 10 includes a fill plug 24 having product ratio indicia 18 thereon. The indicia are in the form of tabs 26 that depend down from the plug 24 when the container 10 is turned right-side up for insertion into the chamber 14.

Figure 4:
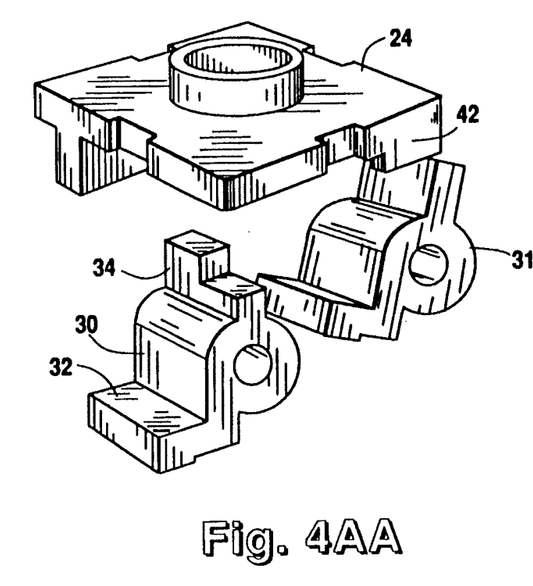
FIG. 4 is a bottom plan view of one product ratio I.D. member.
Figure 4A:
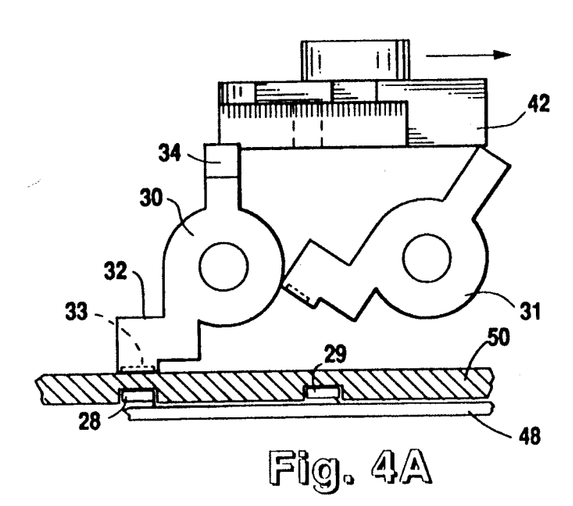
FIG. 4A is a side view of the FIG. 4 I.D. member as it engages the sensor.
Figure 5:
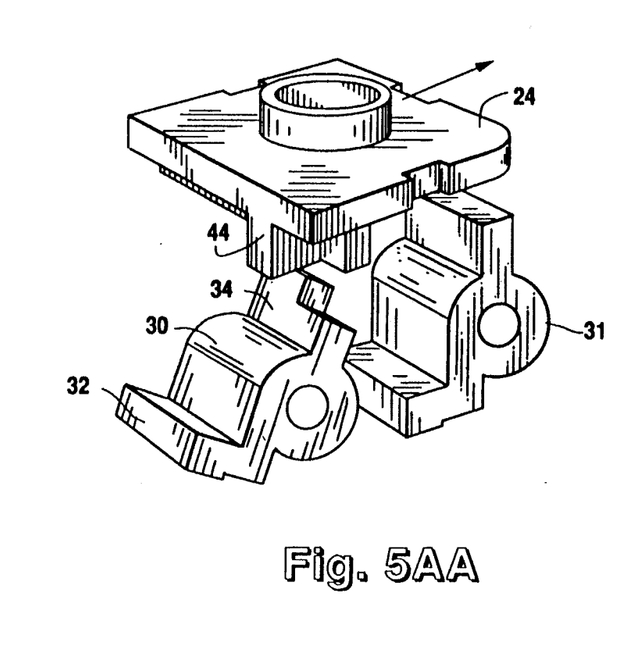
FIG. 5 is a bottom plan view of a second product ratio I.D. member.
Figures 5, 5A:
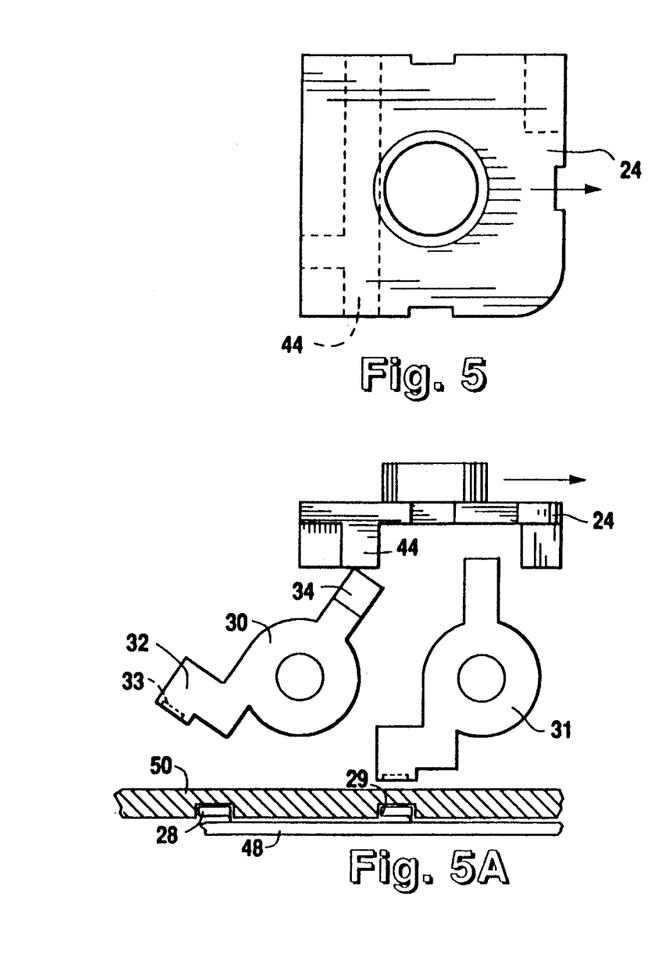
FIG. 5A is a side view of the FIG. 5 I.D. member as it engages the sensor.
Figure 6:
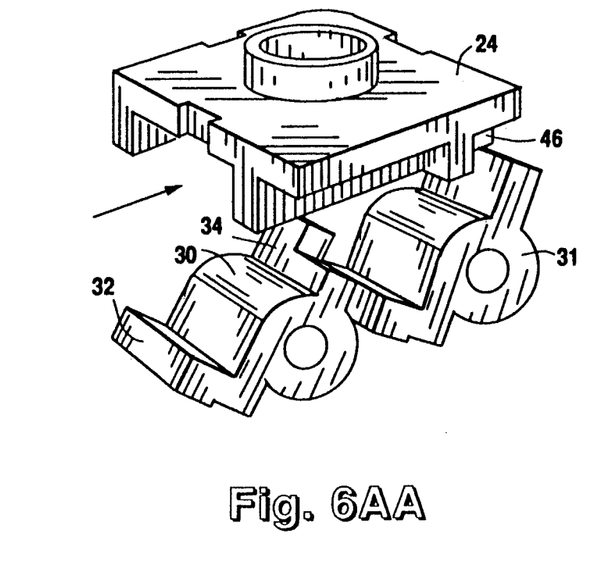
FIG. 6 is a bottom plan view of a third product ratio I.D. member.
Figure 6A:
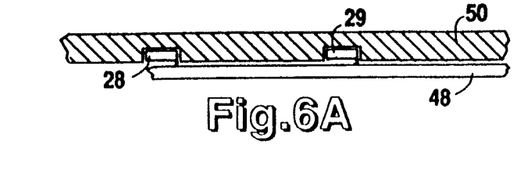
FIG. 6A is a side view of the FIG. 6 I.D. member as it engages the sensor.

Three different arrangements of tabs 22 are provided as shown in FIGS. 4, 5 and 6 to provide four different selections to be sensed by the sensor 16. One selection is that no container is present. The other three selections are each one of three different ratios.

The sensor 16 preferably includes a pair of spaced-apart Hall effect sensors 28 and 29 in a sensing circuit and a pair of spring-biased, two-position, rocker members 30 and 31. The rocker members are substantially identical, so a description of only one will be made. The rocker member 30 includes a sensor arm 32 and a contact arm 34. A magnet 33 is located in the sensor arm. The rocker member 30 is pivotally mounted to a bracket 36 by a pin 38. A spring 40 between the member 30 and the bracket 36 biases the rocker member 30 to the position shown in FIG. 2A with the magnet 30 adjacent or in contact with the Hall effect sensor 28.

The tabs 26 on the fill plug 24 will contact one or the other or both of the contact arms of the rocker members 30 and 31, as shown in FIGS. 4, 5 and 6 to provide one of three different selections that can be sensed by the sensor 16.

In FIG. 4, the tab 42 contacts only the rear rocker member. In FIG. 5, the tab 44 contacts only the front rocker member. In FIG. 6 the tab 46 contacts both rocker members. When contacted, the rocker member pivots and the magnet is moved away from the Hall effect sensor, and its presence is no longer sensed.

Figure 2A:
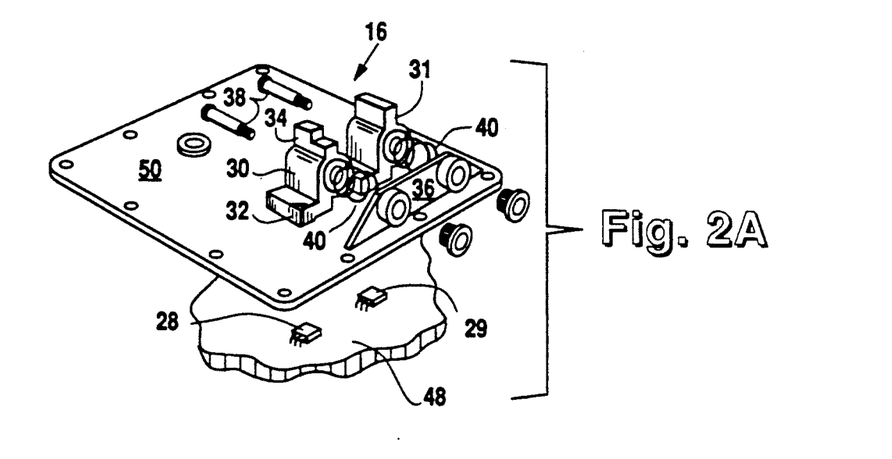
FIG. 2A is an enlarged, partial, exploded view of the sensor of FIG. 2.

As shown in FIG. 2A, the Hall effect sensors 28 and 29 are preferably mounted on a circuit board 48 located beneath a plastic plate 50 that provides part of the floor of the chamber 14. The plate 50 preferably has a recess in its bottom surface of a size to receive each of the Hall effect sensors mounted on the top of the circuit board.

Figure 7:
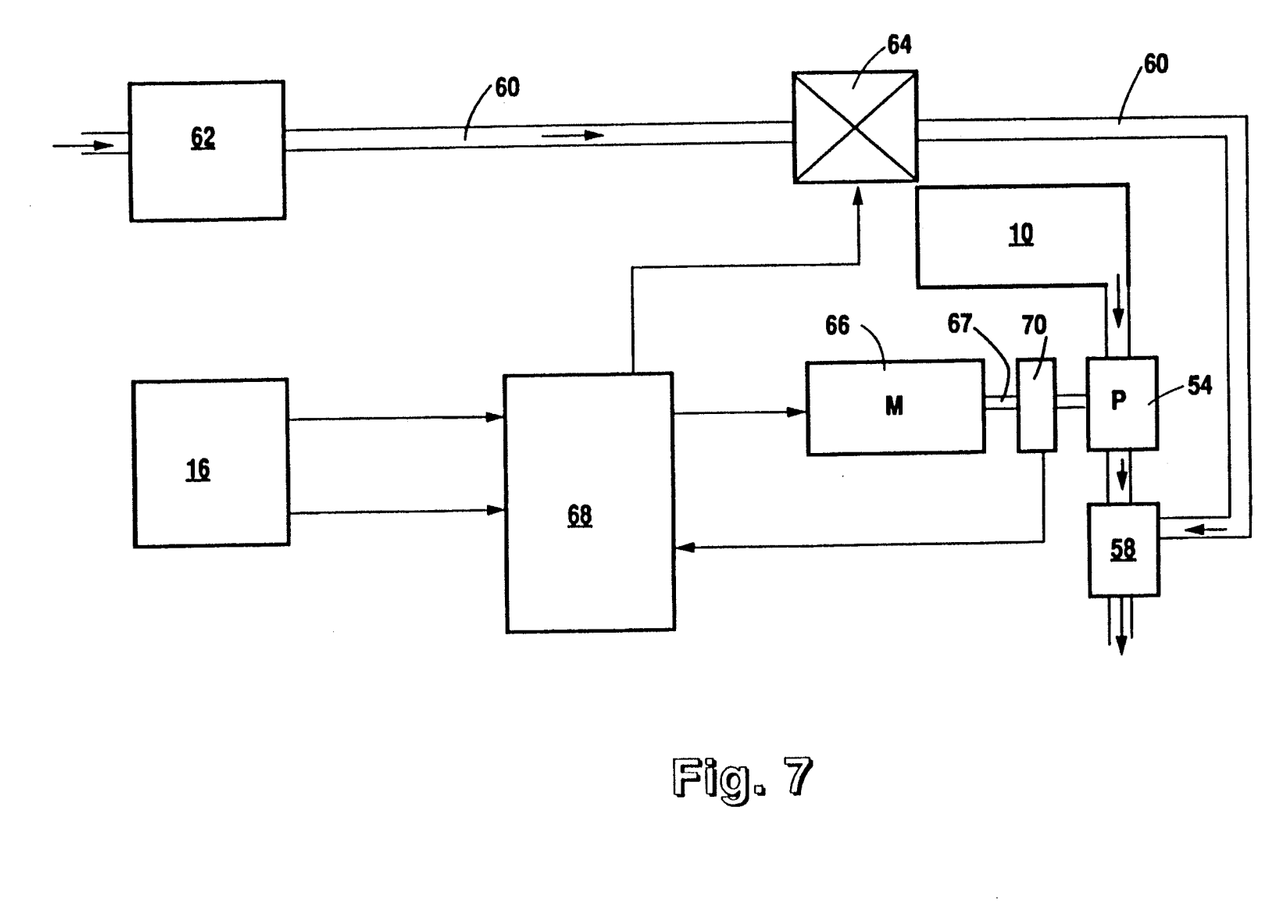
FIG. 7 is a diagrammatic block diagram of the electrical control system.

FIG. 7 is a diagrammatic block diagram of the electrical control system 52 in the dispenser 12. Referring to FIG. 7, juice concentrate is fed from the container 10 to a pump 54 via conduit 56 and then to a mixing chamber 58 where the concentrate is mixed with water fed to the chamber 58 through water line 60. A water pressure regulator 62 and a solenoid on-off valve 64 are in the water line 60. The pump 54 is driven by a motor 66 through shaft 67 energized by the controller 68. A motor speed sensor 70 senses motor speed and gives this information to the controller 68. The sensor 16 also provides the sensed information about the desired product ratio to the controller 68. When a beverage is requested by pushing a selector button 72 in FIG. 1, the motor 66 and the solenoid valve 64 are energized.

The water line also includes a control orifice or washer of the type that is well-known in the art. The controller fixes a predetermined speed for the motor at that sensed product ratio. The motor speed is maintained by feedback from the motor speed sensor 70 to the controller. The motor is preferably a D.C. motor. The controller includes a triple set point controller that responds to the input from the Hall effect sensors. The motor has a 34:1 gear reducer to provide about 38 rpm to the pump at one ratio. A fourth default value corresponds to no container being present, and the motor is not to run.

Figure 8:
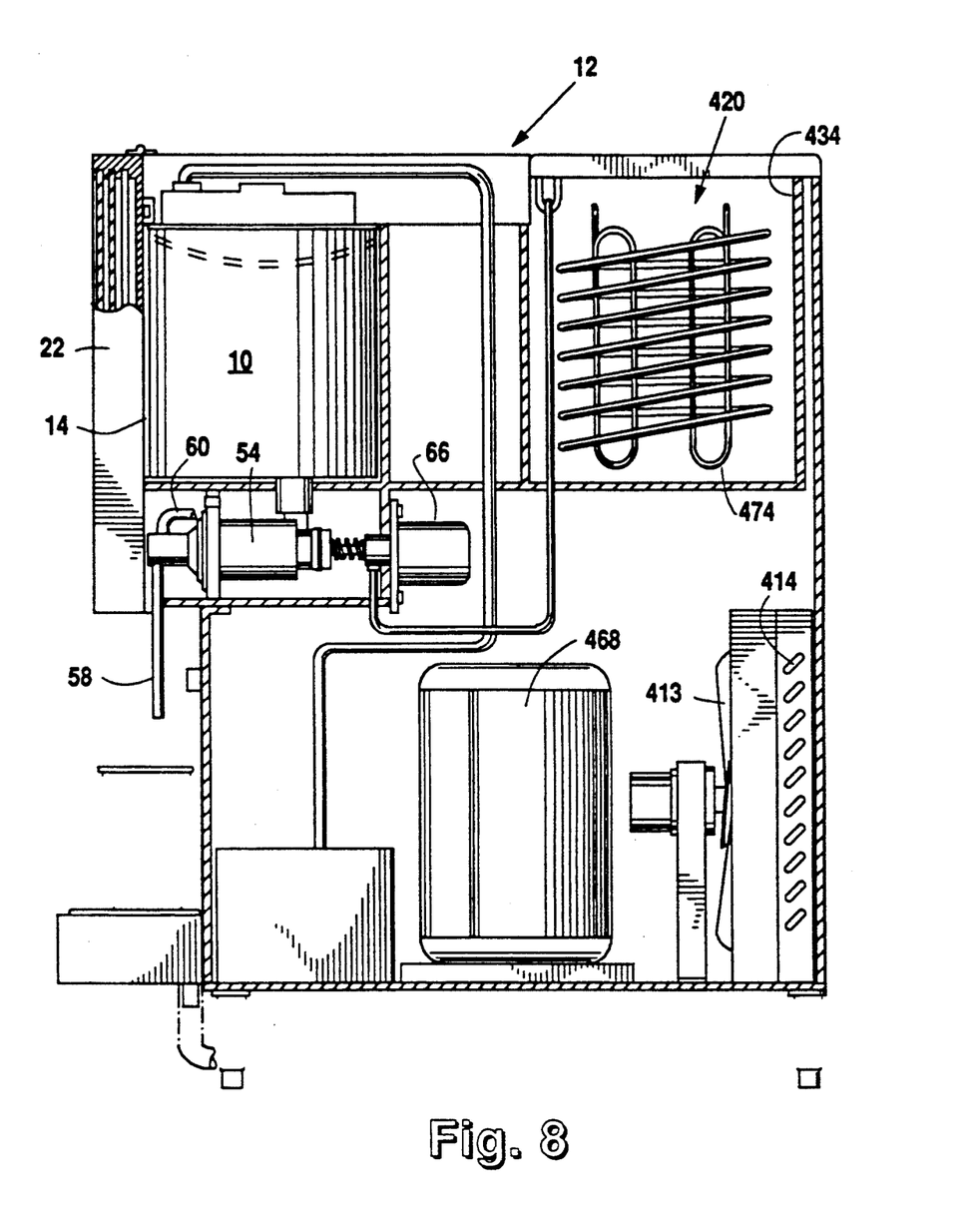
FIG. 8 is a cross-sectional side view through the dispenser of FIG. 1.

FIG. 8 is a cross-sectional side view of the dispenser 12 showing the container 10, the chamber 14, the front cover 22, the pump 54, the mixing chamber 58, the water line 60, and the motor 66. Also shown are the refrigeration system 420, tank 434 for the ice water bath, compressor 468, fan 413, condenser 414 and evaporator coils 474. FIG. 8 also shows the electronics box 80 to which access is provided from the front of the dispenser by removing a front panel and which preferably holds, in a vertical array, a plurality of separate circuit boards which slide into position in the electronics box 80. These boards include, for example, a transformer board, a left motor control board, a right motor control board, and a power supply board. The power supply board includes an I.C. chip and a microprocessor, as will be readily understood by anyone skilled in the art.

Figure 1:
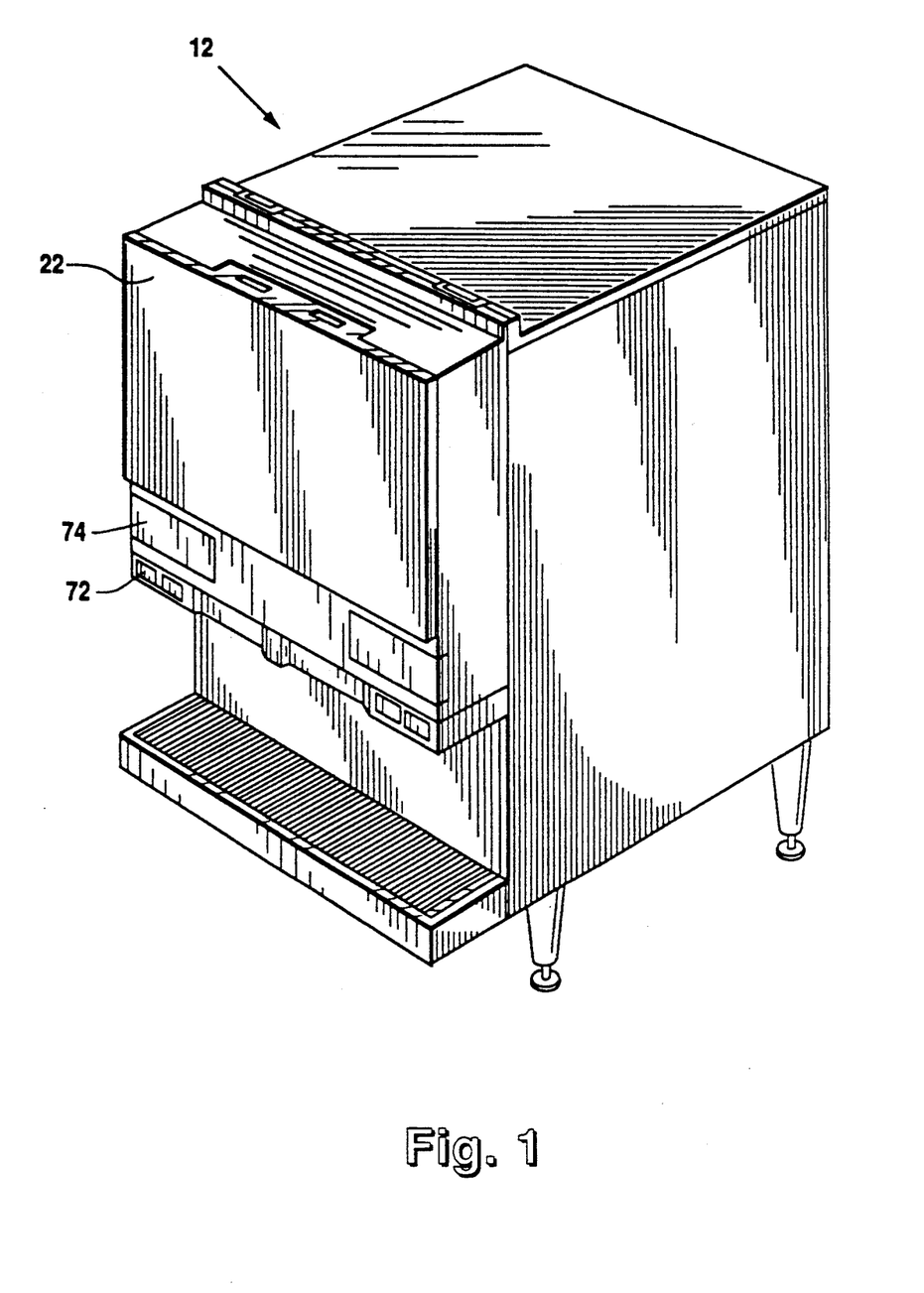
FIG. 1 is a front, top, right side perspective view of a beverage dispenser having the product ratio I.D. system of this invention.

FIG. 1 also shows selector push buttons 72 for use in dispensing the desired beverage. Product identification labels 74 are located above the push buttons. For each product, the left button can be a "start" button and the right button can be a "stop" button.

While the preferred embodiment of this invention has been described above in detail, it is to be understood that variations and modifications can be made therein without departing from the spirit and scope of the present invention.

We claim:

1. Apparatus for automatically identifying a desired product ratio of a product in a concentrate container inserted into a postmix beverage dispenser comprising:
   (a) said postmix beverage dispenser;
   (b) said beverage dispenser including a concentrate container-receiving chamber;
   (c) a product ratio I.D. sensor located in said chamber;
   (d) said concentrate container located in said chamber, said container including product ratio indicia thereon;
   (e) said dispenser including means for receiving and supporting said container in said chamber in a single orientation of said container;
   (f) said product ratio indicia on said container being located on said container in a position such that when said container is in said single orientation in said chamber, said indicia is adjacent to said sensor;
   (g) said container including a fill plug and wherein said indicia being on said fill plug; and
   (h) said sensor including a pair of Hall effect sensors mounted in said chamber.

2. The apparatus as recited in claim 1 wherein said sensor includes a pair of spring-biased, two-position, rocker members in tandem, each having a sensor arm and a contact arm and having a magnet in said sensor arm, and said each of said magnets being adjacent a respective one of said Hall effect sensors when said rocker members are in a first position.

3. The apparatus as recited in claim 2 in which said indicia are tabs extending from said fill plug adapted to selectively contact one or both of said contact arms of said rocker members.

4. Apparatus for automatically identifying a desired product ratio of a product in a concentrate container inserted into a postmix beverage dispenser comprising:
   (a) said postmix beverage dispenser;
   (b) said beverage dispenser including a concentrate container-receiving chamber;
   (c) a product ratio I.D. sensor located in said chamber;
   (d) said concentrate container located in said chamber, said container including product ratio indicia thereon;
   (e) said dispenser including means for receiving and supporting said container in said chamber in a single orientation of said container;
   (f) said product ratio indicia on said container being located on said container in a position such that when said container is in said single orientation in said chamber, said indicia is adjacent to said sensor; and
   (g) said dispenser including means for automatically switching the mixing ratio of the dispensed beverage in response to said desired product ratio.

5. The apparatus as recited in claim 4 wherein said automatic switching means includes a concentrate pump motor and means for changing the motor speed.

* * * * *